(12) United States Patent
Baeuerle et al.

(10) Patent No.: US 8,108,433 B2
(45) Date of Patent: *Jan. 31, 2012

(54) DYNAMIC EXTENSION FIELDS FOR BUSINESS OBJECTS

(75) Inventors: Stefan A. Baeuerle, Rauenberg (DE); Gerd M. Ritter, Heidelberg (DE); Uwe Schlarb, Östringen (DE); Frank Brunswig, Heidelberg (DE)

(73) Assignee: SAP AG, Walldorf (DE)

( * ) Notice: Subject to any disclaimer, the term of this patent is extended or adjusted under 35 U.S.C. 154(b) by 423 days.

This patent is subject to a terminal disclaimer.

(21) Appl. No.: 12/198,315

(22) Filed: Aug. 26, 2008

(65) Prior Publication Data
US 2010/0057776 A1  Mar. 4, 2010

(51) Int. Cl.
*G06F 7/00* (2006.01)
*G06F 17/30* (2006.01)
(52) U.S. Cl. ........................ 707/793; 707/803
(58) Field of Classification Search .................. None
See application file for complete search history.

(56) References Cited

U.S. PATENT DOCUMENTS

| | | | |
|---|---|---|---|
| 2005/0021536 A1 | 1/2005 | Fiedler et al. | |
| 2005/0172261 A1 | 8/2005 | Yuknewicz et al. | |
| 2005/0229186 A1* | 10/2005 | Mitchell et al. | 719/315 |
| 2006/0294141 A1* | 12/2006 | Tsang et al. | 707/104.1 |
| 2007/0088716 A1 | 4/2007 | Brumme et al. | |
| 2008/0005623 A1* | 1/2008 | Said | 714/46 |
| 2008/0109436 A1 | 5/2008 | Klein et al. | |
| 2008/0162622 A1 | 7/2008 | Becker et al. | |
| 2008/0163253 A1* | 7/2008 | Massmann et al. | 719/316 |

FOREIGN PATENT DOCUMENTS
WO 2005/098593 A2 10/2005

OTHER PUBLICATIONS

Willis, G. "Architecture SIS—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

(Continued)

*Primary Examiner* — Uyen Le
(74) *Attorney, Agent, or Firm* — Buckley, Maschoff & Talwalkar LLC

(57) ABSTRACT

A system may include generation of extension metadata defining an extension field of a core node of a business object, and generation of a runtime metadata buffer comprising enhanced metadata, the enhanced metadata based on core metadata of the business object and the extension metadata. In some aspects, a service request associated with the business object is received, it is determined whether the service request is associated with the extension field, an extension service associated with a dynamic data type is provided if it is determined that the service request is associated with the extension field, wherein the dynamic data type is associated with extension data of the extension field and core data of the business object, and a core service associated with an original data type is provided if it is determined that the service request is not associated with the extension field.

24 Claims, 5 Drawing Sheets

OTHER PUBLICATIONS

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

"European Search Report of the European Patent Office", mailed Oct. 26, 2009, for EP 09011216.0-1243, 1pg.

"Non-Final Office Action" mailed Mar. 23, 2011, for U.S. Appl. No. 12/339,328, entitled "UI-Driven Binding of Extension Fields to Business Objects", filed Dec. 19, 2008, 22pgs.

"Non-Final Office Action" mailed Aug. 1, 2011, for U.S. Appl. No. 12/339,392, entitled "Flexible Multi-Tenant Support of Metadata Extensions", filed Dec. 19, 2008, 20pgs.

\* cited by examiner

*200*

SAP Business ByDesign          Advanced  Logout

210

Add Extension Field

Name [Description ID]

BO Name [____]         Data Type [____]
Referenced Field [____]  Label [____]
Field Category [____]    Posted Time [____]
Changed On: [____]

[Save] [Close]

*FIG. 2*

DYNAMIC EXTENSION FIELDS FOR BUSINESS OBJECTS

FIELD

Some embodiments relate to business objects supported by a business process platform. More specifically, some embodiments relate to the creation and usage of dynamic extension fields for business objects within a business process platform.

BACKGROUND

A business object is a software entity representing real-world items used during the transaction of business. For example, a business object may represent a business document such as a sales order, a purchase order, or an invoice. A business object may also represent items such as a product, a business partner, or a piece of equipment.

A business object may include business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

A customer deploying a business solution may desire changes to the business objects included in the business solution. For example, a customer may require a field (e.g., "SerialNumber") which does not exist within the "Product" business object of a business solution. In addition, another customer may require a different additional field in the "Product" business object and/or in another business object of the same business solution.

Conventional techniques for adding a field to an existing business object include APPEND mechanisms which change the definition of the business object at the data dictionary level. An entire database system must be recompiled to effect such a change, and the change occurs globally with respect to all instantiations of the business object within the system. Moreover, the change may require reprogramming of application clients which interact with the changed business object.

In some scenarios, particularly service-on-demand scenarios, multiple customers (tenants) receive services from a single application platform. If one of the multiple tenants adds an extension field to a business object using a conventional technique as described above, each other tenant would be forced to adapt to the additional extension field.

Improved systems for adding an extension field to a business object are desired. An improved system may reduce a need for recompiling the application platform, may reduce a need to adapt application clients to a thusly-changed business object, may enable one or more tenants to add one or more extension fields, and/or may provide tenant-specific views of tenant-specific extension fields.

BRIEF DESCRIPTION OF THE DRAWINGS

FIG. 2 is a view of a user interface for adding an extension field to a system according to some embodiments.

DETAILED DESCRIPTION

Figure 1:
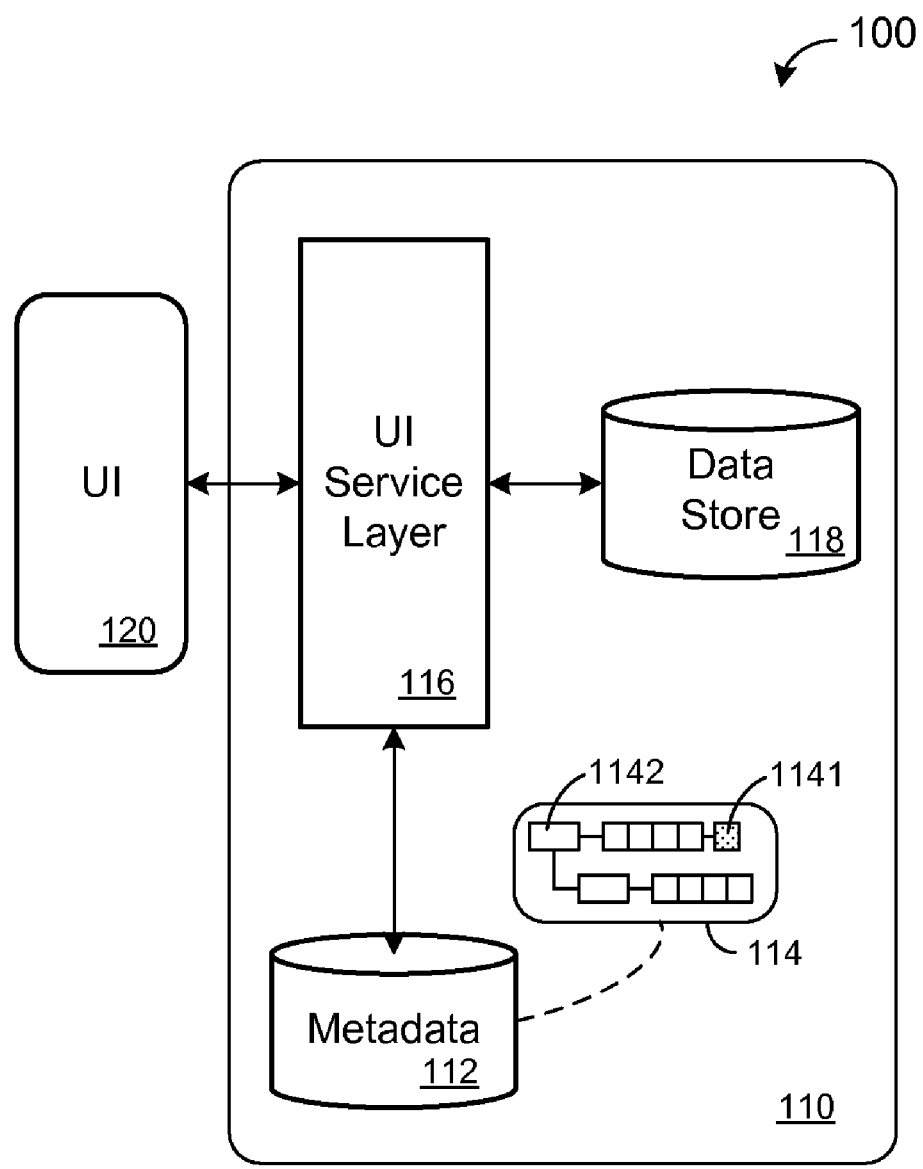
FIG. 1 is a block diagram of components to add an extension field to a core node of a business object according to some embodiments.

FIG. 1 is a block diagram of system 100 according to some embodiments. System 100 includes business process platform 110 and user interface 120. Generally, business process platform 110 may provide services to user interface 120 according to some embodiments. Business process platform 110 may comprise an SAP application platform based on SAP Netweaver®, but is not limited thereto. In this regard, FIG. 1 represents a logical architecture for describing processes according to some embodiments, and actual implementations may include more or different components arranged in other manners.

Business process platform 110 may provide services based on business objects as described above. Metadata 112 may include information defining the structure and attributes of these business objects such as business object 114. UI service layer 116 may use metadata 112 to access and manipulate business object data stored in data store 118.

An operator (e.g., a key user) may manipulate user interface 120 to interact with UI service layer 116 according to some embodiments. Such interactions may include requesting business object views, modifying business object data, and defining business object views. User interface 120 may be displayed by any suitable device. For example, the device may include any necessary software to support a proprietary interface (e.g., a proprietary client application) or execution engine (e.g., a Web browser). A device to display the user interfaces is capable of communication (including sporadic communication—e.g., mobile devices) with business process platform 110.

FIG. 2 illustrates user interface 200 according to some embodiments. The key user may access user interface 200 through a user interface adaptation dialog provided by UI service layer 116. User interface 200 allows the user to define an extension field associated with a core node of a business object.

A user may populate the fields of area 210 to define a new extension field. According to the illustrated embodiment, the fields allow a user to define a name of the extension field as well as other information associated with the new extension field. Area 210 may include other or different fields according to some embodiments, and such fields may be populated using drop-down menus or any other input mechanism.

In response, metadata 112 associated with business object 114 is changed to reflect extension field 1141. As illustrated, extension field 1141 is associated with core node 1142. The extension field is also created in persistent data store 118.

According to some embodiments, the extension field is created in persistent data store 118 without modifying the database structure of persistent data store 118. Rather, the instances for the extension field are stored in existing database tables.

Figure 3:
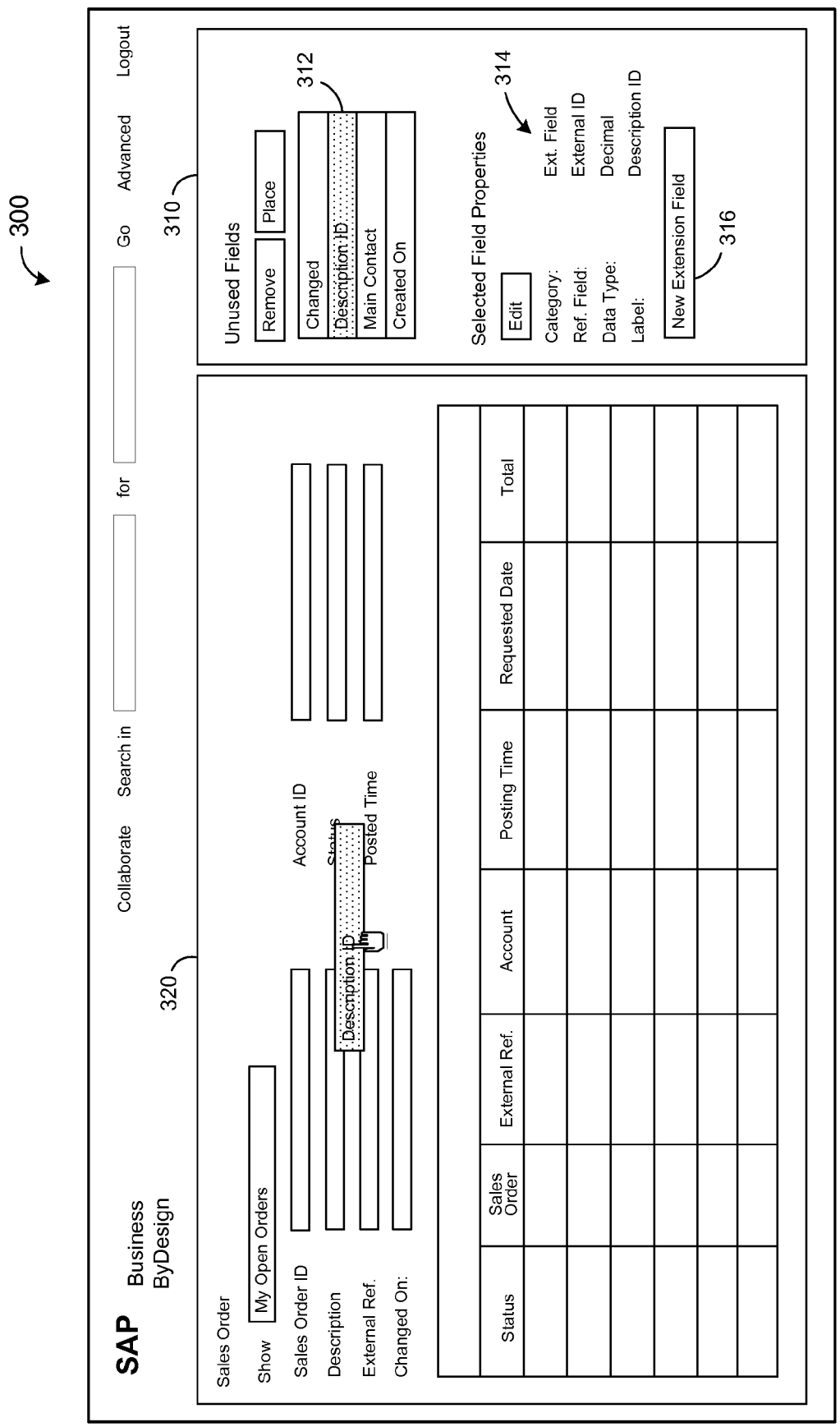
FIG. 3 is a view of a user interface for adding an extension field to a floorplan according to some embodiments.

An existing user interface (i.e., floorplan) served by UI service layer 116 may be changed to include the new extension field. FIG. 3 illustrates adaptation dialog 300 including extensibility toolset 310 and user interface 320. Adaptation dialog 300 reflects an on-demand Web-based solution in which dialog 300 is displayed by a Web browser.

User interface 320 is associated with a business object and served by UI service layer 116. Extensibility toolset 310 includes a list of fields of associated with the business object.

The listed fields may include core fields and previously-defined extension fields. Dialog 300 illustrates selection of extension field "Description ID" 312 from toolset 310 and dragging of an icon representing the extension field into a desired area of user interface 320.

Extensibility toolset 310 also provides Field Properties area 314 to view and edit properties (i.e., attributes) of the selected extension field. Moreover, a user may select New Extension Field link 316 to define a new extension field. In some embodiments, a key user invokes adaptation dialog 300 directly from user interface 320 and then invokes user interface 200 therefrom using link 316. Any change to the floorplan may be enabled by UI service layer 116 through appropriate communication with metadata 112 and data store 118.

In some embodiments, a search interface associated with the changed user interface may be adapted to account for the newly-added extension field. Related forms and analytics may also be adapted to access the new extension field using appropriate design tools and service layers of platform 110. As mentioned above, these adaptations may result in corresponding changes to metadata 112 of the affected business object and the persistences of the business object stored in data store 118.

Many systems and approaches may be employed to represent extension field 1141 within data store 118 and metadata 112. Extension field data of particular instances of a business object may be coupled to the lifecycle of core data of the business object persisted in data store 118. According to some embodiments, extension data of a particular instance is associated with a same NodeId as core data of the same instance. During creation, a $TMP-NodeId specified by a caller is replaced with a real NodeID derived by the service provider. In some embodiments, core data of each business object includes a field for storing a pointer to extension data.

For each created extension field, metadata 112 may include an extension field name and a core node with which the extension field is associated. Metadata 112 may also include a technical (e.g., Advanced Business Application Programming (ABAP)) name of the field.

In contrast to conventional field extensibility mechanisms such as those described above, it may be desired to avoid redefining an extended business object at a data dictionary level. Accordingly, in order to provide "dynamic" addition of the extension data, metadata 112 of business object 114 may be enhanced to replace an existing core data type of business object 114 with a new data type including core data and extension data. The enhanced metadata may include the name of the new dynamic data type and attribute information of the extension field(s).

Data of a dynamic data type is generated during program or service execution (if it does not exist yet on platform 110). Such data is not generated during design time or in a data dictionary during system installation or system launch. Recompilation of programs may thereby be avoided (i.e., since they are dynamically implemented) and tenant-specific extensions thereby allowed.

Tenant-specific extension fields may be enabled by adhering to naming conventions within metadata 112. For example, namespaces for core fields and tenant extensions (EXTENSION1 and EXTENSION2) may be specified as follows:

```
GENERATED_DATA_TYPE
    CORE_FIELD_1
    CORE_FIELD_2
    ...
```

```
/EXTENSION1/FIELD1
/EXTENSION1/FIELD2
/EXTENSION2/FIELD1
/EXTENSION2/FIELD2
```

Another example of namespaces usable in conjunction with some embodiments is as follows:

```
GENERATED_DATA_TYPE
    CORE_FIELD_1
    CORE_FIELD_2
    ...
    /EXTENSION1/FIELDS
        FIELD1
        FIELD2
    /EXTENSION2/FIELDS
        FIELD1
        FIELD2
```

Figure 4:
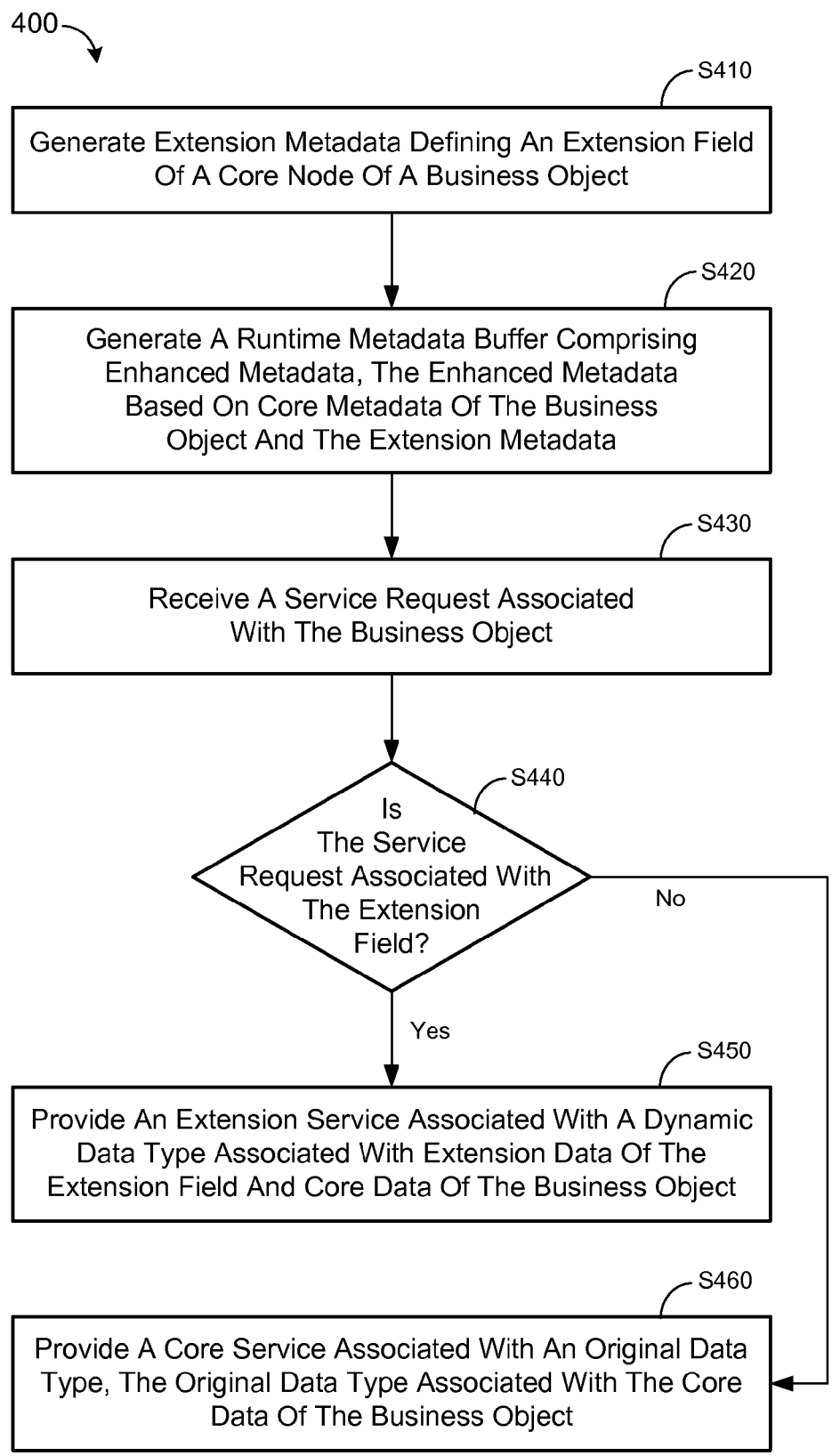
FIG. 4 is a flow diagram of a process according to some embodiments.
Figure 5:
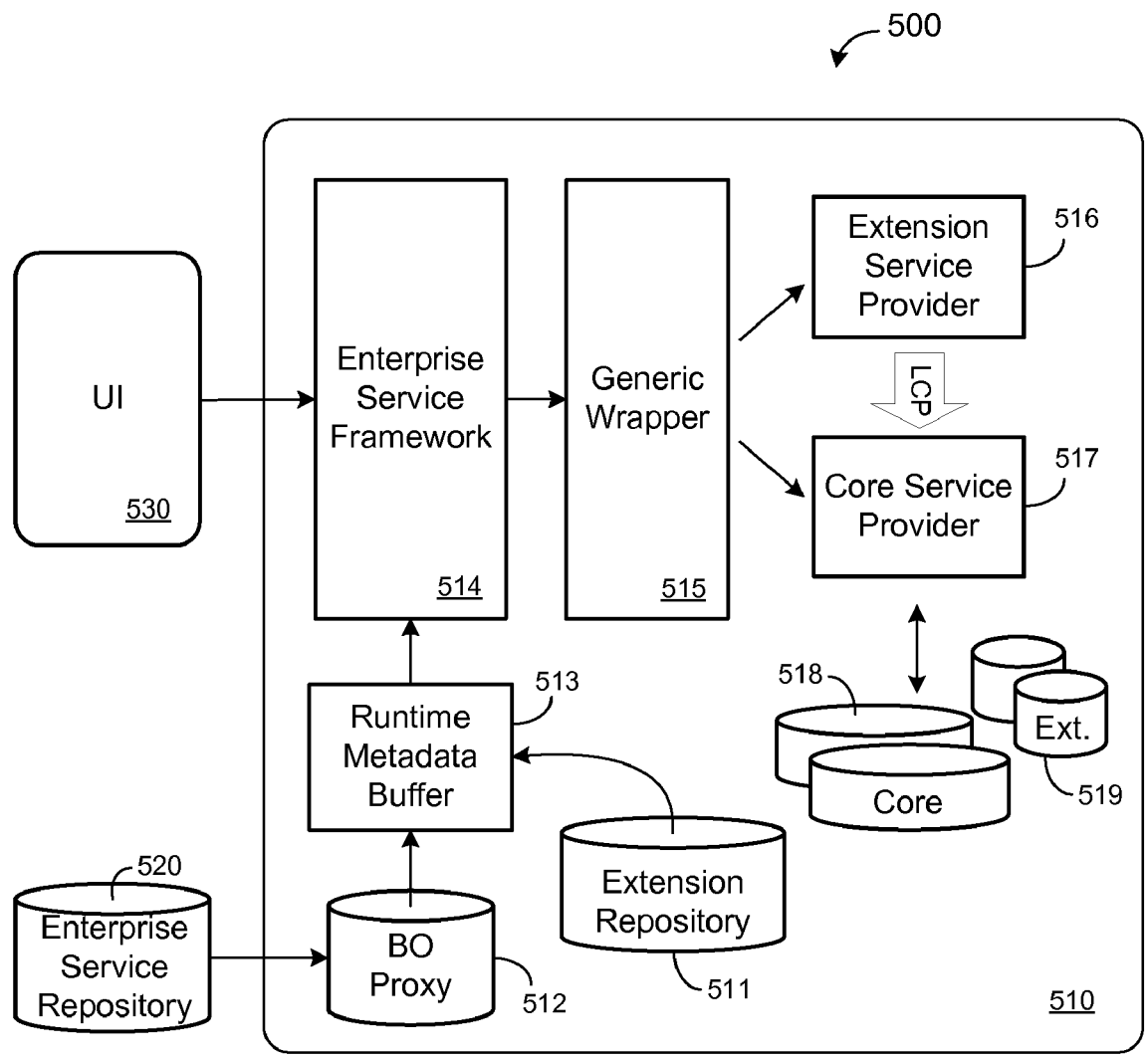
FIG. 5 is a detailed block diagram of a system according to some embodiments.

Replacing the core data type with another data type including core data and extension data may render existing clients inoperable. FIG. 4 is a flow diagram of process 400 to support business objects including extension fields according to some embodiments. FIG. 5 is a detailed block diagram of system 500 to execute process 400 according to some embodiments. Process 400 may be executed by systems differing from system 500, and system 500 is not limited to process 400.

Initially, extension metadata is generated at S410. The extension metadata defines an extension field of a core node of a business object. The core node may be a root node of the business object or a child node of the business object. According to some embodiments, the extension metadata is generated by a UI service layer in response to key user input as described above with respect to FIGS. 1 and 2.

The extension metadata may comprise an extension field name, a core node with which the extension field is associated, a technical name of the extension field, a dynamic data type name and attribute information of the extension field. The extension metadata may be generated and stored in a tenant-specific manner as described above.

The extension metadata may also be stored in association with a user, thereby enabling user-specific extension fields. Such extension fields would only be available to those users with which the extension fields are associated. According to some embodiments, the extension metadata is generated and stored within extension repository 511 of business process platform 510. The extension metadata may be stored in any other entity within application platform 510.

The extension metadata may be generated at S410 during execution of platform 510. In this regard, enterprise service repository 520 may include business object models for use by platform 510. For each business object model, a business object proxy 512 including core business object metadata is generated in platform 510.

A runtime metadata buffer including enhanced metadata is generated at S420. The enhanced metadata is based on core metadata of a business object and the extension metadata of the business object generated at S410. In the FIG. 5 example, runtime metadata buffer 513 is generated to include enhanced metadata based on the core metadata of business object proxy 512 and the extension metadata of extension repository 511. The enhanced metadata may include all extension fields defined in platform 510, or may include only extension fields specific to a particular tenant.

Next, at S430, a service request associated with the business object is received. For example, business process platform 510 may receive a "modify" or "retrieve" request from user interface 530 at S430. The request is directed to ESF framework 514.

According to conventional operation, ESF framework 514 then calls an appropriate core service provider based on metadata associated with the business object in buffer 513. According to process 400, however, it is determined at S440 whether the received service request is associated with an extension field.

Generic wrapper 515 may be instantiated to perform the determination at S440. Generic wrapper 515 may base the determination on the enhanced metadata of extension repository 511, and/or on similarly-enhanced metadata stored in an extension registry (not shown). Flow proceeds to S450 if it is determined that the service request is associated with an extension field of the business object.

At S450, an extension service is provided. The extension service is associated with a dynamic data type, which is in turn associated with extension data of the extension field and with core data of the business object. FIG. 5 illustrates extension service provider 516 being called by generic wrapper 515 according to some embodiments.

Extension service provider 516 may comprise a class implementing a set of well-defined interfaces. The interfaces of extension service provider 516 may provide initialization of the extension in order to obtain an instance of a local client proxy (LCP) to communicate with core service provider 517. The interfaces may implement pre- and post-exits for existing core services. For example:

```
IF_EXT_PROVIDER_ACCESS
    PRE_MODIFY
    POST_MODIFY
    PRE_RETRIEVE
    POST_RETRIEVE
    ...
IF_EXT_PROVIDER_ACTION
    PRE_EXECUTE_ACTION
    POST_EXECUTE_ACTION
    ...
```

Generally, signatures of the foregoing methods may be derived from the signature of the corresponding core services (e.g., EXPORTING parameters become CHANGING parameters).

Extension service provider 516 may use an LCP instance to request a core service from core service provider 517 at S450. More specifically, in order to provide an extension service, extension service provider 516 may be required to access one or more core services of core service provider 517. For example, extension service provider 516 may call one or more core services of core service provider 517 (i.e., with the original data type) in order to access core data stored in core data persistency 518.

Returning to S440, generic wrapper 515 may directly call core service provider 517 if it is determined that the service request is not associated with an extension field of the business object. Flow then proceeds to S460, at which point core service provider 517 provides a core service associated with the original data type. The original data type is associated with the core data of the business object. Since core services are still callable with the original data type, clients which do not support extension fields remain operable.

Core service provider 517 may access core data 518 to provide core services. In the illustrated example, core data 518 is stored separately from extension data 519.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
   generating, by a computer, extension metadata defining an extension field of a core node of a business object; and
   generating, by a computer, a runtime metadata buffer comprising enhanced metadata, the enhanced metadata based on core metadata of the business object and the extension metadata.

2. A method according to claim 1, further comprising:
   generating, by a computer, a business object proxy comprising the core metadata of the business object based on a model of the business object,
   wherein the enhanced metadata is generated based on the core metadata of the business object proxy.

3. A method according to claim 2, wherein the model of the business object is stored in an enterprise services repository,
   wherein the business object proxy is generated in a business process platform, and
   wherein the extension metadata is stored in an extension repository of the business process platform.

4. A method according to claim 1, further comprising:
   receiving a service request associated with the business object;
   determining, by a computer, whether the service request is associated with the extension field;
   if it is determined that the service request is associated with the extension field, providing an extension service associated with a dynamic data type, the dynamic data type associated with extension data of the extension field and core data of the business object; and
   if it is determined that the service request is not associated with the extension field, providing a core service associated with an original data type, the original data type associated with the core data of the business object.

5. A method according to claim 4,
   wherein determining whether the service request is associated with the extension field is based on the enhanced metadata of the runtime metadata buffer.

6. A method according to claim 4, further comprising:
   providing, by a computer, a core service associated with the original data type if it is determined that the service request is associated with the extension node.

7. A method according to claim 1,
wherein the enhanced metadata comprises a dynamic data type associated with core data of the business object and extension data of the extension field.

8. A method according to claim 1,
wherein the extension repository stores extension metadata associated with a plurality of database tenants, and
wherein the enhanced metadata is associated with a single database tenant.

9. A system comprising:
an extension repository storing extension metadata defining an extension field of a core node of a business object; and
a runtime metadata buffer comprising enhanced metadata, the enhanced metadata based on core metadata of the business object and the extension metadata.

10. A system according to claim 9, further comprising:
a business object proxy comprising the core metadata of the business object,
wherein the enhanced metadata is based on the core metadata of the business object proxy.

11. A system according to claim 10, further comprising:
an enterprise services repository storing a model of the business object; and
a business process platform comprising the business object proxy and the extension repository.

12. A system according to claim 9, further comprising:
an enterprise services framework to receive a service request associated with the business object;
a generic wrapper class to determine whether the service request is associated with the extension field;
an extension service provider to provide an extension service associated with a dynamic data type if it is determined that the service request is associated with the extension field, the dynamic data type associated with extension data of the extension field and core data of the business object; and
a core service provider to provide a core service associated with an original data type if it is determined that the service request is not associated with the extension field, the original data type associated with the core data of the business object.

13. A system according to claim 12,
wherein the generic wrapper class is to determine whether the service request is associated with the extension field based on the enhanced metadata of the runtime metadata buffer.

14. A system according to claim 12, wherein if it is determined that the service request is associated with the extension field, the extension service provider is further to call the core service provider to provide a core service associated with the original data type.

15. A system according to claim 9,
wherein the enhanced metadata comprises a dynamic data type associated with core data of the business object and extension data of the extension field.

16. A system according to claim 9,
wherein the extension repository stores extension metadata associated with a plurality of database tenants, and
wherein the enhanced metadata is associated with a single database tenant.

17. A non-transitory computer readable medium storing program code executable by a computer to perform a method, the method comprising:
generating extension metadata defining an extension field of a core node of a business object; and
generating a runtime metadata buffer comprising enhanced metadata, the enhanced metadata based on core metadata of the business object and the extension metadata.

18. A medium according to claim 17, the method further comprising:
generating a business object proxy comprising the core metadata of the business object based on a model of the business object,
wherein the enhanced metadata is generated based on the core metadata of the business object proxy.

19. A medium according to claim 18, wherein the model of the business object is stored in an enterprise services repository,
wherein the business object proxy is generated in a business process platform, and
wherein the extension metadata is stored in an extension repository of the business process platform.

20. A medium according to claim 17, the method further comprising:
receiving a service request associated with the business object;
determining whether the service request is associated with the extension field;
if it is determined that the service request is associated with the extension field, providing an extension service associated with a dynamic data type, the dynamic data type associated with extension data of the extension field and core data of the business object; and
if it is determined that the service request is not associated with the extension field, providing a core service associated with an original data type, the original data type associated with the core data of the business object.

21. A medium according to claim 20,
wherein determining whether the service request is associated with the extension field is based on the enhanced metadata of the runtime metadata buffer.

22. A medium according to claim 20, the method further providing a core service associated with the original data type if it is determined that the service request is associated with the extension node.

23. A medium according to claim 17,
wherein the enhanced metadata comprises a dynamic data type associated with core data of the business object and extension data of the extension field.

24. A medium according to claim 17,
wherein the extension repository stores extension metadata associated with a plurality of database tenants, and
wherein the enhanced metadata is associated with a single database tenant.

* * * * *